United States Patent
Zhao et al.

(10) Patent No.: US 7,833,473 B2
(45) Date of Patent: Nov. 16, 2010

(54) MATERIAL FOR STORAGE AND PRODUCTION OF HYDROGEN, AND RELATED METHODS AND APPARATUS

(75) Inventors: Ji-Cheng Zhao, Latham, NY (US); John Patrick Lemmon, Schoharie, NY (US)

(73) Assignee: General Electric Company, Niskayuna, NY (US)

( * ) Notice: Subject to any disclaimer, the term of this patent is extended or adjusted under 35 U.S.C. 154(b) by 1720 days.

(21) Appl. No.: 10/903,382

(22) Filed: Jul. 30, 2004

(65) Prior Publication Data

US 2006/0024193 A1    Feb. 2, 2006

(51) Int. Cl.
    *C22C 21/00* (2006.01)
(52) U.S. Cl. ...................... 420/528; 423/111
(58) Field of Classification Search .......... 423/579, 423/648.1, 111; 420/528
    See application file for complete search history.

(56) References Cited

U.S. PATENT DOCUMENTS

| | | | |
|---|---|---|---|
| 3,249,831 A | 5/1966 | New et al. | |
| 3,988,150 A | 10/1976 | Shalavina et al. | |
| 3,993,511 A | 11/1976 | Daniele | |
| 4,061,551 A | 12/1977 | Ivanova et al. | |
| 4,135,917 A | 1/1979 | Badaliants et al. | |
| 4,308,248 A * | 12/1981 | Anderson | 423/579 |
| 4,925,811 A | 5/1990 | Menigaux et al. | |
| 5,525,435 A | 6/1996 | Pourarian | |
| 6,221,230 B1 * | 4/2001 | Takeuchi et al. | 205/133 |
| 6,359,289 B1 | 3/2002 | Parkin | |
| 6,534,033 B1 * | 3/2003 | Amendola et al. | 423/648.1 |
| 6,682,609 B1 | 1/2004 | Tsuruta et al. | |

FOREIGN PATENT DOCUMENTS

WO    0238494    5/2002

OTHER PUBLICATIONS

US2003/0003010 A1, Okada et al., "Hydrogen Storage Alloy", Jan. 2, 2003.
JP2003054901 A1, Japanese copy and English Translation provided by Micro Patent, Feb. 26, 2003.

* cited by examiner

*Primary Examiner*—George Wyszomierski
*Assistant Examiner*—Weiping Zhu
(74) *Attorney, Agent, or Firm*—Richard A. DeCristofaro

(57) ABSTRACT

An apparatus, method, and material for storing and retrieving hydrogen are presented. The apparatus comprises a storage component, and this component comprises a hydrogen storage medium. The hydrogen storage medium comprises gallium. The method for storing and retrieving hydrogen comprises providing a source of hydrogen; providing a storage component, the component comprising a hydrogen storage medium, wherein the hydrogen storage medium comprises gallium; and exposing the medium to hydrogen from the source. The material comprises at least about 10 atom percent gallium, with the balance comprising at least one of aluminum and boron. The material is a metallic alloy.

2 Claims, No Drawings

MATERIAL FOR STORAGE AND PRODUCTION OF HYDROGEN, AND RELATED METHODS AND APPARATUS

BACKGROUND OF THE INVENTION

This invention relates to the storage and production of hydrogen. More particularly, this invention relates to solid-state hydrogen storage and production systems. This invention also relates to materials used to store and generate hydrogen in such systems.

Hydrogen is a "clean fuel" because it can be reacted with oxygen in hydrogen-consuming devices, such as a fuel cell or a combustion engine, to produce energy and water. Virtually no other reaction byproducts are produced in the exhaust. As a result, the use of hydrogen as a fuel effectively solves many environmental problems associated with the use of petroleum based fuels. Safe and efficient storage of hydrogen gas is, however, essential for many applications that can use hydrogen. In particular, minimizing volume and weight of the hydrogen storage systems are important factors in mobile applications.

Several methods of storing hydrogen are currently used but these are either inadequate or impractical for widespread mobile consumer applications. For example, hydrogen can be stored in liquid form at very low temperatures. However, the energy consumed in liquefying hydrogen gas is about 30% of the energy available from the resulting hydrogen. In addition, a standard tank filled with liquid hydrogen will become empty in about a week through evaporation; thus dormancy is also a problem. These factors make liquid hydrogen impractical for most consumer applications.

An alternative is to store hydrogen under high pressure in cylinders. However, a 100 pound steel cylinder can only store about one pound of hydrogen at about 2200 psi, which translates into 1% by weight of hydrogen storage. More expensive composite cylinders with special compressors can store hydrogen at higher pressures of about 4,500 psi to achieve a more favorable storage ratio of about 4% by weight. Although even higher pressures are possible, safety factors and the high amount of energy consumed in achieving such high pressures have compelled a search for alternative hydrogen storage technologies that are both safe and efficient.

In view of the above, there is a need for safer, more effective methods of storing and recovering hydrogen. In addition, there is a desire to minimize the overall system volume and weight. Moreover, there is a desire for inexpensive and efficient methods for producing hydrogen for use as a fuel.

BRIEF DESCRIPTION

These and other needs are addressed by embodiments of the present invention. One embodiment is an apparatus for storing hydrogen. The apparatus comprises a storage component adapted to receive hydrogen from a hydrogen source, and this component comprises a hydrogen storage medium. The hydrogen storage medium comprises gallium. Another embodiment is a material comprising at least about 10 atom percent gallium, and the balance comprising at least one of aluminum and boron.

DETAILED DESCRIPTION

Several different metal hydrides have been extensively studied as potential solid-state storage media for hydrogen fuel systems. However, these materials thus far have proven to have only limited potential due to a relatively low gravimetric capacity for storage of recoverable hydrogen. For example, most hydrides are able to store up to about 2 weight percent of hydrogen, with certain high-potential materials, for example, sodium alanate (NaAlH4), potentially storing up to about 4 weight percent hydrogen. Even the high-potential materials fall short of the U.S. Department of Energy's stated goals of 4.5% by 2005, 6% by 2010, and 9% by 2015. In part, the shortcomings of many of the hydride materials are due to their inability to release all of the hydrogen stored within their molecular structures. For example, sodium alanate decomposes at temperatures below 200° C. to release hydrogen gas, but instead of completely decomposing and releasing all of the hydrogen as gas, it forms sodium hydride (NaH), which is a much more stable compound than the alanate. To recover all of the hydrogen from the NaH, the material would have to be heated to over 500° C., which is impractical in many applications.

Embodiments of the present invention are based on the ability of certain gallium (Ga)-bearing materials to form hydrides that release all of their stored hydrogen at practical temperatures (e.g., below about 200° C.). Unlike NaH, gallium hydride ($Ga_2H_6$) is not a particularly stable compound and has a melting point of about $-15°$ C. Thus, new hydrogen storage materials with the ability to release all stored hydrogen as useful gas may be made by combining gallium with other elements, such as, for example, aluminum or boron, that do not form stable binary hydrides.

Accordingly, one embodiment of the present invention is an apparatus for storing hydrogen. The apparatus comprises a storage component such as, for example, a tank or some other suitable container adapted to receive hydrogen from a hydrogen source. The storage component comprises a hydrogen storage medium, and this medium comprises gallium. Metallic alloys, ceramics, and other forms of matter comprising gallium, are contemplated as suitable candidates for use as the storage medium material.

In some embodiments, the gallium is present in the storage medium in an amount of at least about 10 atom percent. In certain embodiments, the gallium is present in an amount of at least about 20 atom percent, including particular embodiments where the gallium is present in an amount in the range from about 20 atom percent to about 50 atom percent. The precise selection of the amount of gallium in the medium is dependent upon a number of factors, including, as examples, the identity of any materials to be combined with the gallium, the desired final properties of the medium, and the particular application for which hydrogen is being stored.

In certain embodiments, the hydrogen storage medium further comprises aluminum (Al). Aluminum, as discussed above, does not form a highly stable binary hydride, and this characteristic enhances the ability of ternary gallium-aluminum-hydrogen compounds, such as, for example, $Ga(AlH_4)_3$, $GaAlH_4$, and $Ga(AlH_4)_2$, to release all of the hydrogen stored in the compound upon decomposition, without the formation of highly stable intermediate hydrides that would retard the hydrogen evolution process. The gallium-aluminum hydrides decompose to form hydrogen gas, pure gallium, and a solid solution of gallium in aluminum. Gallium-aluminum materials have high theoretical storage capacities for hydrogen storage. For example, an alloy comprising about 25 atom percent Ga and 75 atom percent Al can theoretically store over 7 weight percent hydrogen, all of which is potentially recoverable at temperatures below about 200° C.

In some embodiments, the aluminum is present in an amount of at least about 50 atom percent, and in particular embodiments, the aluminum is present in an amount in the range from about 50 atom percent to about 95 atom percent.

Specific embodiments include the case where aluminum is present in an amount of about 75 atom percent, and another case where aluminum is present in an amount of about 67 atom percent. In certain embodiments the medium consists essentially of aluminum and gallium, with the aluminum present in any of the ranges described above.

Boron is another element that, like aluminum, does not form a highly stable binary hydride, and thus has potential as an additive to the hydrogen storage medium described herein for the same reasons described for aluminum. Gallium, boron, and hydrogen form several ternary hydrides, including, for example, $GaBH_4$, $Ga(BH_4)_2$, and $Ga(BH_4)_3$. In some embodiments, the hydrogen storage medium comprises gallium and boron. In certain embodiments, the boron is present in an amount of at least about 50 atom percent, including embodiments where the boron is present in an amount in the range from about 50 atom percent to about 75 atom percent. In a particular embodiment, the boron is present in an amount of about 75 atom percent. In further embodiments, the medium consists essentially of boron and gallium, with the boron present in any of the ranges described above.

The hydrogen storage medium may alternatively comprise gallium, boron, and aluminum, thereby taking advantage of potential synergies among the various compounds these elements form together with hydrogen. Suitable composition ranges include, for example, the case where boron is present in an amount in the range from about 10 atom percent to about 40 atom percent and the gallium is present in the range from about 10 atom percent to about 35 atom percent.

In an exemplary, practical application of the hydrogen storage apparatus of the present invention, hydrogen is supplied from a source, such as a tank of hydrogen or a hydrogen production apparatus such as an electrolysis cell or hydrocarbon gas reformer, and then introduced into the storage component, where the storage medium is disposed within the storage component. In one example, the medium comprises a solid material at standard ambient temperature and pressure, and in particular embodiments is a granular or powder material disposed within the storage component. Regardless of the form of the medium or where it is disposed, the hydrogen is exposed to the storage medium, whereupon the hydrogen would react with the storage medium to form a hydride. When hydrogen gas is required to be supplied, the storage medium is heated to decompose the hydride, and the resultant hydrogen gas is transported to an outlet for use.

To further enhance the speed and extent to which the hydrogen is absorbed and released (desorbed) by the medium, the medium, in certain embodiments, further comprises a hydrogen absorption/desorption catalyst. These catalyst materials theoretically enhance the performance of the medium by facilitating the process by which hydrogen reacts with the medium constituents to form and decompose hydride. Examples of such catalysts include oxides; elements such as titanium, vanadium, zirconium, niobium, yttrium, lanthanum, manganese, nickel, iron, cobalt, silicon, germanium, palladium, and any of the lanthanide elements; oxides of the foregoing elements; and compounds and mixtures of any of the foregoing materials. The amount of catalyst added included in the medium depends in part upon the identity of the catalyst and the composition of the medium. In certain embodiments the catalyst is present in an amount of up to about 10 weight percent, such as, for example, from about 0.1 weight percent to about 10 weight percent.

In certain applications, the instability of the hydride compound formed by a gallium-containing hydrogen storage medium may be such that the medium would spontaneously, and undesirably, decompose before hydrogen was required. This potential issue is addressed in certain embodiments of the present invention by doping the medium with a stabilizer, so that the medium further comprises the stabilizer. As used herein, the term "stabilizer" refers to chemical additions to the medium that serve to increase the temperature at which the medium decomposes. In particular embodiments, the stabilizer comprises a mild electron donor, such as, for example, lithium, sodium, magnesium, potassium, calcium, and combinations thereof. Stabilizers, when combined with aluminum, boron, or combinations thereof, tend to form complex hydrides with higher decomposition temperatures than gallium borohydrides and gallium-aluminum hydrides. By doping the low-stability gallium-containing compound with stabilizer, the stability of the hydride formed upon exposure of the medium to hydrogen can be increased to a desired level suitable for a particular application. Doping of complex gallium-containing storage media may be achieved by any of several well-known mechanisms. As an example, chlorides of gallium and magnesium are reacted with sodium alanate, whereby the sodium displaces the gallium and magnesium to form sodium chloride, and the gallium and magnesium combine with the alanate radical to form a hydride compound of gallium and aluminum that is doped with magnesium. This hydride compound is then thermally decomposed into an alloy comprising aluminum, gallium, and small amounts of magnesium-containing compounds such as, for example, magnesium-gallium or magnesium-aluminum compounds. In some embodiments, the hydrogen storage medium comprises up to about 20 weight percent stabilizer, and in particular embodiments the medium comprises from about 5 to about 15 weight percent stabilizer.

Some materials suitable for use in embodiments of the present invention, such as aluminum, have a propensity to form an oxide scale over its surface when exposed to the air. This scale may act as an insulation layer, preventing or hindering the reaction of the medium material with hydrogen. To combat this problem, in certain embodiments the hydrogen storage medium further comprises an oxide scale reducer, which inhibits the formation of the detrimental scale. Sodium hydride is an example of a suitable scale reducer. In particular embodiments, the scale reducer is present in an amount of up to about 20 weight percent.

To take advantage of the desirable characteristics of the various embodiments described above, a particular embodiment of the hydrogen storage apparatus of the present invention comprises a storage component and a hydrogen storage medium disposed within the storage component; wherein the hydrogen storage medium comprises at least about 10 atom percent gallium, at least one of aluminum and boron, up to about 10 weight percent of a hydrogen absorption/desorption catalyst, up to about 20 weight percent of a stabilizer, and up to about 20 weight percent of an oxide scale reducer.

Embodiments of the present invention also include a method for storing and retrieving hydrogen. The method comprises providing a source of hydrogen; providing a storage component adapted to receive hydrogen from the source, the component comprising a hydrogen storage medium, wherein the hydrogen storage medium comprises gallium; and exposing the medium to hydrogen from the source. Upon exposure, the medium reacts with the hydrogen to form the various hydrides, as described previously. Suitable alternatives for the source of hydrogen, the storage component, and the storage medium include those described above for the storage apparatus embodiments. The method, in some embodiments, further comprises heating the hydrogen storage medium to a hydrogen retrieval temperature. Doing this will desorb hydrogen that is stored in the crystal structure of the various hydrides, and, if the temperature is sufficiently high, will decompose the hydrides back to the original hydrogen storage medium material and hydrogen gas. In certain embodiments the retrieval temperature is less than about 200° C. The ability of the Ga-bearing hydrogen storage medium to form hydrides that fully decompose at such relatively low temperatures potentially allows application of embodiments of the present invention in a number of useful areas, including, for example, on-board fuel storage for automobiles; fuel cells, including polymer electrolyte membrane (PEM) fuel cells; and internal combustion engine powered automobiles.

Another embodiment of the present invention is the composition of matter that corresponds to certain aspects of the hydrogen storage medium described above. The material comprises at least about 10 atom percent gallium and the balance comprises at least one of aluminum and boron. In accordance with this particular embodiment, the material is a metallic alloy. As used herein, the term "alloy" means a mixture of a metallic element with other metallic, and possibly non-metallic, elements or compounds. In particular embodiments, the material is a solid at standard ambient temperature and pressure. Suitable composition ranges for the aluminum and boron constituents for this material, as well as the possibility for additions of absorption/desorption catalysts, stabilizers, and oxide scale reducers, are the same as those presented above for the hydrogen storage medium. Particular embodiments of the material of the present invention include a material comprising at least about 10 atom percent gallium; at least one of aluminum and boron; up to about 10 weight percent of a hydrogen absorption/desorption catalyst, such as, for example, from about 0.1 weight percent to about 10 weight percent of the catalyst; up to about 20 weight percent of a stabilizer, such as, for example, from about 0.1 weight percent to about 20 weight percent of the stabilizer; and up to about 20 weight percent of an oxide scale reducer, such as, for example, from about 0.1 to about 20 weight percent of the scale reducer.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A metallic alloy composition, comprising:
   at least about 10 atom percent gallium; and
   the balance consisting essentially of at least one of aluminum and boron, and the metallic alloy is a ternary gallium-aluminum-hydrogen composition.

2. The composition as defined in claim 1, wherein the ternary gallium-aluminum-hydrogen composition is selected from the group consisting of $Ga(AlH_4)_3$, $GaAlH_4$, and $Ga(AlH_4)_2$.

* * * * *